United States Patent
Tolbert, Jr.

[11] Patent Number: 6,037,725
[45] Date of Patent: Mar. 14, 2000

[54] TWO STEP POWER OUTPUT MOTOR

[75] Inventor: John W. Tolbert, Jr., Bristol, Tenn.

[73] Assignee: Bristol Compressors, Inc., Bristol, Va.

[21] Appl. No.: 09/014,752

[22] Filed: Jan. 28, 1998

[51] Int. Cl.$^7$ .................................................. H02P 1/54
[52] U.S. Cl. .......................... 318/110; 318/471; 318/747; 318/772; 307/73
[58] Field of Search ...................................... 318/110, 106, 318/727, 747–748, 772, 471–473; 307/73

[56] References Cited

U.S. PATENT DOCUMENTS

| | | |
|---|---|---|
| 4,236,874 | 12/1980 | Sisk . |
| 4,245,966 | 1/1981 | Riffe . |
| 4,248,053 | 2/1981 | Sisk . |
| 4,396,359 | 8/1983 | Kropiwnicki . |
| 4,409,532 | 10/1983 | Hollenbeck et al. . |
| 4,479,419 | 10/1984 | Wolfe . |
| 4,494,447 | 1/1985 | Sisk . |
| 4,503,371 | 3/1985 | Sugita ...................... 318/443 |
| 4,566,289 | 1/1986 | Iizuka et al. . |
| 4,598,764 | 7/1986 | Beckey . |
| 4,838,769 | 6/1989 | Gannaway . |
| 4,879,502 | 11/1989 | Endo et al. . |
| 5,070,932 | 12/1991 | Vlasak . |
| 5,129,792 | 7/1992 | Abousabha . |
| 5,201,640 | 4/1993 | Heinzelmann et al. . |
| 5,252,905 | 10/1993 | Willis et al. . |
| 5,592,059 | 1/1997 | Archer . |
| 5,619,860 | 4/1997 | Yuji et al. . |
| 5,780,990 | 7/1998 | Weber . |

FOREIGN PATENT DOCUMENTS

| | | |
|---|---|---|
| 0 547351 A2 | 6/1993 | European Pat. Off. . |
| 3138812 | 4/1983 | Germany . |
| 4322223 | 1/1995 | Germany . |

OTHER PUBLICATIONS

Warner Installation and Operation Manual, SECO® AC Drive, SL3000 Series AC Motor Drives, 1–5 HP 230 VAC, 1–15 HP 460 VAC, Warner Electric®.

Instructions, Champagne Astro✰Stat Low Voltage Multi-Stage Thermostats (Heating, Cooling, and Heating–Cooling), White Rodgers, The "Total Concept" People.

Product Information, Definite Purpose Controls, Contactors, Starters, 2–Speed Controller, General Electric, GEA–11540B.

Fowler, Richard J., *Electricity Principles and Applications*, McGraw–Hill Book Company, 1979, pp. 440–451.

*Primary Examiner*—David Martin
*Attorney, Agent, or Firm*—Finnegan, Henderson, Farabow, Garrett & Dunner, L.L.P.

[57] ABSTRACT

An electrical control system for an induction motor for achieving optimum efficiency at both full and partial loads at markedly reduced electrical components costs while maximizing reliability over the range of load, and for achieving a two step motor power output in a greatly simplified manner, the circuit having an electrical induction motor adapted for connection to line electrical power at maximum motor operating frequency, and to a second source of electrical power at approximately one half of the maximum operating frequency, wherein an electrical switch is provided for selectively connecting each power source to the motor, wherein the second source is a generator for producing a reduced frequency sine wave form.

11 Claims, 1 Drawing Sheet

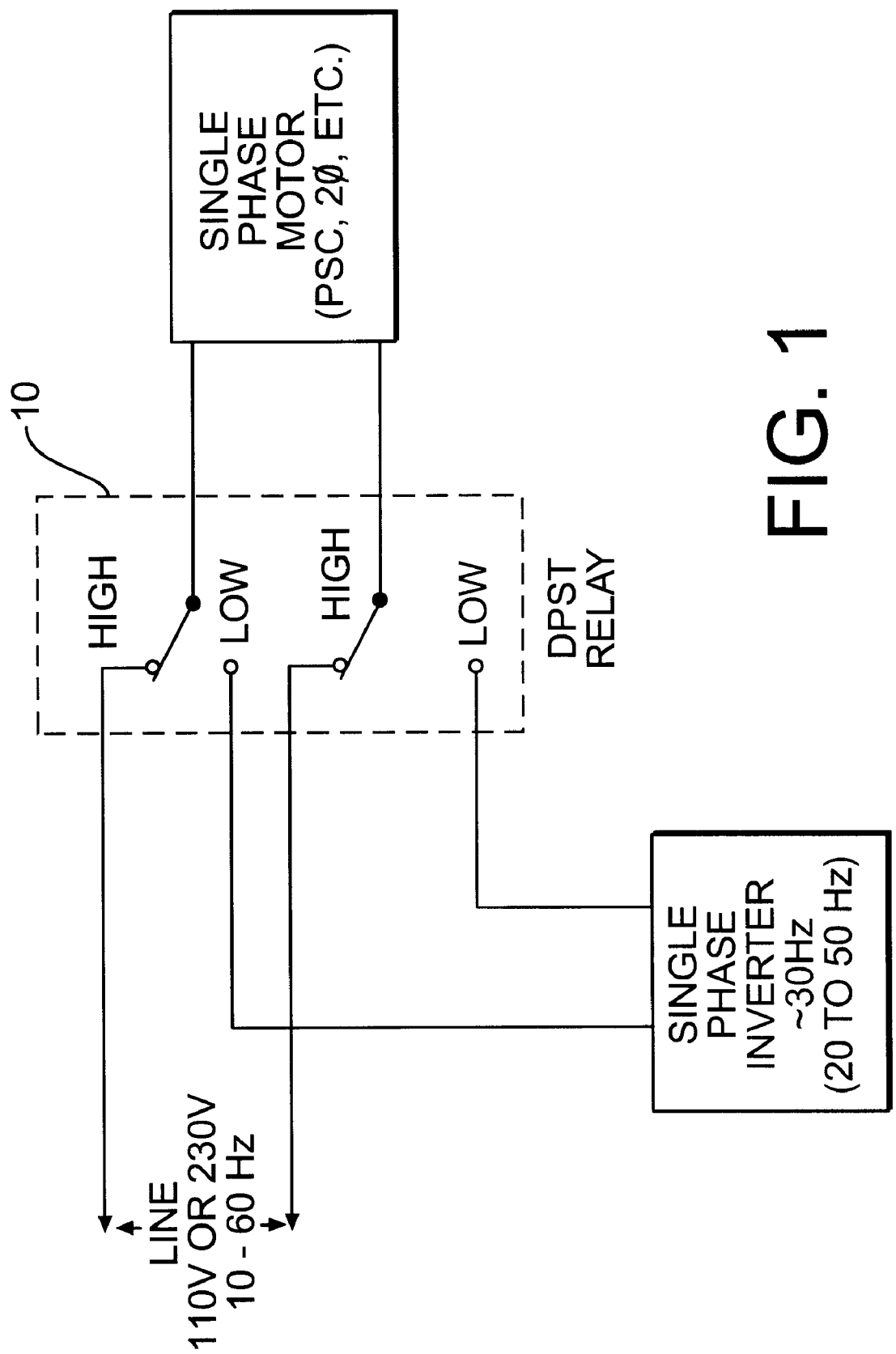

TWO STEP POWER OUTPUT MOTOR

BACKGROUND OF THE INVENTION

1. Field

This invention concerns a highly simplified speed control system for use with electrical motors of all types and phase wiring, especially for blower or fan induction motors used in conjunction with air moving, e.g., air conditioning systems, or with the motors per se which drive refrigerant compressors, whereby the motor can be readily shifted between a full load first speed and a reduced load second speed. Such compressors are shown for example in U.S. Pat. Nos. 4,396,359; 5,129,792; and 5,201,640, the disclosures of which are hereby incorporated herein by reference.

In regard to compressors, vacuum or other pumps or machines, and particularly those reciprocating piston compressors used in single or multiple cylinder refrigeration, air conditioning systems or heat pumps or the like, including machines such as scotch yoke compressors of U.S. Pat. No. 4,838,769, it is often desirable to vary the compressor output, i.e., compressor capacity modulation, in accordance with cooling load requirements. Such modulation allows large gains in efficiency while normally providing reduced sound, improved reliability, and improved creature comfort including one or more of reduced air noise, better de-humidification, warmer air in heat pump mode, or the like.

With reference to the blower or fan motor used with such modulatable compressors, the need for a motor speed control system which reduces the input power to the motor in proportion to the power necessary to attain the desired optimum CFM for the reduced capacity mode arises, e.g., from the fact that when the compressor capacity is reduced approximately 50%, if the evaporator blower motor is maintained at high CFM air output, the capacity of the evaporator coil is reached at some airflow level near 50% of full compressor capacity. As the function of the evaporator is to change liquid to vapor and thus absorb host, if the evaporator capacity is reached, the heat absorbed becomes sensible and further heat is absorbed by the refrigerant itself which reduces Rs molecular density and the overall efficiency of the system is thus compromized since the power input to the blower should be reduced by the cube root of the full speed blower motor power.

Such reduction in motor speed however, is not without its difficulties, as many negative electrical phenomena are associated with conventional motor speed reducers which employ such means as winding tapping, solid state voltage reduction, i.e., wave form chopping to change induction motor speed in response to a change in cooling load requirements, whether it be with respect to the blower motor or the compressor motor. One such phenomenon is the undesirable reduction in motor efficiency, i.e., Power out/Power in ratio, which occurs when the motor "designed optimum load point" is underreached, This phenomenon is classically represented by the speed/torque/efficiency curve well known to the electrical motor art.

2. Prior Art

Heretofore, the only readily available equipment on the market for providing full range optimum efficiency is the totally variable speed, motor controller or inverter devices such as that shown schematically on page 9 and described fully in the 63 page ®1996 Warner Electric, ®SECO Electronics installation & Operation Manual for SECO®AC Drive, SL 3000 Series AC Motor Drives, the disclosures of which Manual is hereby incorporated herein by reference in its entirety.

Further details and theory of electrical circuitry for inverters in general is given on pages 440–461 of the book entitled ELECTRICITY, Principles and Applications, by Richard Fowler, Western Washington University, McGraw-Hill Book Company, Gregg Division, ISBN-0-07-021704-1, which publication is hereby incorporated herein in its enurety.

However, such inverters are expensive and complex since they must give wide band operation. Such inverters ore typically sized for the highest f/speed, e.g., max motor speed and max Hz. Such sizing requires large, heavy electric load carrying components, more complex micro processors, heavier DC current and the like. Also, their complexltes adversely affect their reliability, particularly as the result of lengthy use for varying motor speed over a wide range.

While such inverters find use in the present invention, it is preferred to use inverters which are properly sized to handle the reduced voltages and currents which attend the reduced motor operation "at between about 20 to 50 Hz, and, more preferably at between about 32 to 37 HZ" after operation.

OBJECTS OF THE INVENTION

Objects therefore. of the present invention, are to provide an electrical motor speed control system which is non-complex, which has great reliability of operation over long periods of use, which can be manufactured at greatly reduced expense, and which provides two speed motor control.

SUMMARY OF THE INVENTION

This and other objects hereinafter becoming evident have been attained in accordance with the present invention which, in a structural embodiment is defined as an electrical control system for an induction motor for achieving optimum efficiency at both full and partial loads at markedly reduced electrical components costs while maximizing reliability over the range of load, and for achieving a two step motor power output in a greatly simplified manner, said circuit comprising an electrical induction motor, a first source of electrical power at maximum motor operating frequency, i.e., line power derived from general public power grids preferably at a frequency of between about 50 and 60 Hz and at a voltage of between about 110 volts to 440 volts, a second source of electrical power at less than said maximum operating frequency, and switching means for selectively connecting each said source to sold motor, wherein said first source is line power, and wherein said second source comprises a reduced frequency wave form generator.

BRIEF DESCRIPTION OF THE DRAWINGS

The invention will be understood further from the drawings herein and the description thereof, wherein the single figure is an electrical schematic of the present motor control circuit in simplified form.

DETAILED DESCRIPTION OF THE DRAWINGS

Referring to the drawing wherein the legends are self explanatory, the high and low contacts are closed or opened in turn preferably by a solenoid type of contactor 10 such as are readily commercially available as per the General Electric 'Definite Purpose Controls' Product information catalogue, 23 pages, GEA -11540B 4/87 15M 1800, which publication is hereby incorporated herein by reference in its entirety.

The contactor 10 is preferably actuated at the appropriate temperature by a two stage thermostat such as available from the WHITE-ROGERS DIVISION of Emerson Electric Co. and described in detail in the four page INSTRUCTIONS booklet, PART No. 37-3421, which publication is hereby incorporated by reference in its entirety.

The blower motor is, e.g., such as those available from Lau industries and having a 60 Hz, 1/2 HP and 1080 rpm rated load, and designed for about 400 in-put Watts to produce about 1000 CFM at 0.5 IWG. At reduced load the in-put is about 1000 Watts and produces about 600 CFM at 37 Hz at 0.08 IWG.

The compressor which is best suited for this application at this time has the following structure and operating characteristics:

| | | |
|---|---|---|
| (a) | Size (capacity) | 3 TON |
| (b) | Cylinder No. | 2 |
| (c) | Cylinder Displacement | 3.34 In$^8$/rev. |
| (d) | Stroke (piston) | 0.805 in. |
| (e) | Electrical Drive Motor | GE model 0434A, 1φ PSC Induction AC |
| (f) | Electrical Motor Strength | 252 oz. ft. Max./ 90 oz. ft. rated load |
| (g) | Run Capacitor | 45 μF/370 VAC |
| (h) | Speed (rated load) | 3500–3550 rpm |

The reduced frequency wave form generator is a Warner 3θ SL 3000 electronic device adapted for producing 1θ simulated sine wave. Other generators include, e.g., a conventional electro-mechanical generator.

The invention has been described in detail with particular reference to preferred embodiments thereof, but it will be understood that variations and modifications will be effected with the spirit and scope of the invention.

I claim:

1. A method for attaining optimum motor efficiency at both full and partial loads for a two step motor power for HVAC application, said method comprising:
   providing an electrical induction motor;
   providing to said motor a first source of electrical power at maximum motor operating frequency;
   providing to said motor a second source of electrical power at less than said maximum operating frequency;
   providing a thermostat for sensing a temperature;
   providing a switch for selectively connecting one of said sources to said motor at a given time; and
   operating the switch based on the sensed temperature;
   wherein said first source is line power, and wherein said second source comprises a reduced frequency wave form generator.

2. The method of claim 1 wherein said line power is selected from about 50 to about 60 Hz and from about 110 volts to about 440 volts, and said reduced frequency is from about 20 to about 50 Hz.

3. The method of claim 2 wherein the line voltage is from about 110 to about 240, and said reduced frequency is from about 32 to about 37 Hz.

4. The method of claim 1 wherein said line power and said reduced frequency wave form are each single phase.

5. An electrical control system for an induction motor for achieving optimum efficiency at both full and partial loads for a two step motor power for HVAC applications, said circuit comprising:
   an electrical induction motor;
   a first source of electrical power at maximum motor operating frequency
   a second source of electrical power at less than said maximum operating frequency;
   a thermostat capable of sensing a temperature; and
   a switch for selectively connecting one of said sources to said motor at a given time based on the sensed temperature, wherein said first source is line power, and wherein said second source comprises a reduced frequency wave form generator.

6. The system of claim 5 wherein said line power is selected from about 50 to about 60 Hz at from about 110 volts to about 440 volts, and said reduced frequency is from about 20 to about 50 Hz.

7. The system of claim 6 wherein the line voltage is from about 110 to about 240, and said reduced frequency is from about 32 to about 37 Hz.

8. The system of claim 5 wherein said line power and said reduced frequency wave form are each single phase.

9. The system of claim 5 wherein said wave form is a simulated sine wave.

10. A method for attaining optimum motor efficiency at both full and partial loads for a two step motor power for HVAC application, said method consisting essentially of:
    providing an electrical induction motor;
    providing to said motor a first source of electrical power at maximum motor operating frequency;
    providing to said motor a second source of electrical power at less than said maximum operating frequency;
    providing a thermostat for sensing a temperature;
    providing a switch for selectively connecting one of said sources to said motor at a given time; and
    operating the switch based on the sensed temperature;
    wherein said first source is line power, and wherein said second source comprises a reduced frequency wave form generator.

11. An electrical control system for an induction motor for achieving optimum efficiency at both full and partial loads for a two step motor power for HVAC applications, said circuit consisting essentially of:
    an electrical induction motor;
    a first source of electrical power at maximum motor operating frequency;
    a second source of electrical power at less than said maximum operating frequency;
    a thermostat capable of sensing a temperature; and
    a switch for selectively connecting one of said sources to said motor at a given time based on the sensed temperature, wherein said first source is line power, and wherein said second source comprises a reduced frequency wave form generator.

* * * * *